Sept. 9, 1969 R. A. ERB 3,466,189
METHOD FOR IMPROVING HEAT TRANSFER IN CONDENSERS
Filed Sept. 2, 1966
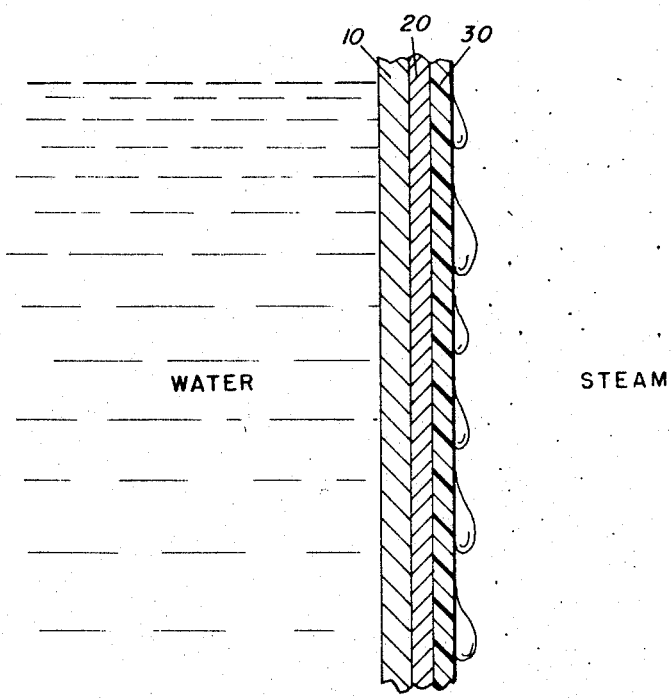
INVENTOR
ROBERT A. ERB United States Patent Office 3,466,189
Patented Sept. 9, 1969

3,466,189
METHOD FOR IMPROVING HEAT TRANSFER IN CONDENSERS
Robert A. Erb, Valley Forge, Pa., assignor to the United States of America as represented by the Secretary of the Interior
Filed Sept. 2, 1966, Ser. No. 577,092
Int. Cl. B32b 27/04; C23c 13/00
U.S. Cl. 117—132                  4 Claims

ABSTRACT OF THE DISCLOSURE

Improved efficiency in the condensation of water vapor is achieved through the use of para-xylylene polymer coatings as cooling surfaces.

---

The increase in heat transfer obtained by using a surface which promotes the dropwise condensation of water rather than filmwise condensation has been well known in the art ever since the work of Schmidt, Schurig and Sellschop (E. Schmidt, W. Schurig and W. Sellshopp, Technische Mechanic and Thermodynamik 1, 53 (1930)). The reason set forth for the great increase in heat transfer rate and correspondingly high condensation rate with dropwise condensation appears to be that the steam can be cooled directly on the bare metal areas between the drops. This is in contrast to filmwise condensation where a film of liquid water covers the entire surface. Since the metal has a much higher heat transfer coefficient than water, the advantage of dropwise condensation becomes apparent. The exact nature of the heat and mass transfer associated with dropwise formation is not known, however it has been consistently reported that higher heat transfer coefficients are obtained by the use of surfaces promoting dropwise condensation. The need for greater efficiency in condensers is well known industry-wide, but in the area of water purification and desalination where great quantities of water must be treated and condensed and where increases in efficiency with corresponding decreases in cost are vigorously sought, the need for improved condensation efficiency is of vital concern. Therefore, the present invention will find particular utility in water purification processes.

A great number of substances and coatings have been suggested as promoters of dropwise condensations. Among these are metals such as zirconium and tantalum (U.S. Patent 2,248,909), chromium (U.S. Patent 2,259,024), gold (copending commonly assigned application Ser. No. 408,432), silver (copending commonly assigned application Ser. No. 408,433), and platinum group metals (copending commonly assigned application Ser. No. 421,132). The reliability of chromium in promoting dropwise condensation is highly suspect. Schmidt et al. (Techniche Mechanik and Thermodynamik 1, 53 (1930)) found that before any dropwise condensation occurs, the chromium had to be highly polished. Drew et al. (Transactions of American Institute of Chemical Engineers, vol. 31, 605 (1935)) disputed the contention that chromium was a dropwise promoter for condensing steam, Hampson et al. (Proc. Inst. Mech. Engrs. B, 1B, 282 (1952) and Tanner et al. (Jour. Appl. Chem. 14 439 (1964)) have shown that generally, chromium promotes film-wise condensation of steam. Thus, while highly polished specimens of chromium surfaces may promote dropwise condensation for short periods of time they cannot be counted on for long term reliability. Silver, gold and platinum group metals are particularly effective in raising heat transfer coefficients by promoting dropwise condensation, however, the cost of these materials detracts from their advantages.

Other materials which have the ability to chemisorb on a metal substrate have also been used to coat the surfaces of heat exchangers. Among these materials are oleic acid, stearic acid, diethyl sulfide, benzyl mercaptan, K-amyl xanthate, dithiophosphates, α-naphthylamine, a mixture of oleic acid and lube oil, dibenzyl sulfide, S-ethyl octadecyl xanthate, SS - decamethylene - di(octadecyl-xanthate), glycerol tri-exthoxy thiocarbonyl) thioundeconoate, dodecyltrisethyl-thio silane and montanic acids. The problem with these materials has been short lifetimes especially with industrial steam containing impurities.

A number of waxes such as beeswax, montan wax, Irish peat wax, candelilla wax, and Carnauba wax have also been tried as dropwise promoters but again their lifetimes are very short.

Another approach has been to coat the heat exchanger surfaces with specific polymers. In general, although polymers are hydrophobic, they are usually also poor heat conductors. It has therefore been necessary when using polymers, to choose one which will form a thin adherent hydrophobic film on the heat exchanger surfaces. The two classes of polymers which have previously been used are the silicone resins and the fluorocarbons. A widely tested material has been tetrafluoroethylene polymer (such as Du Pont Teflon TFE). The problem with this compound has been the inability to form films of the desired thickness.

It has now been found that very effective dropwise condensation may be achieved on heat exchanger surfaces when the exchanger surfaces have been coated with a thin layer of poly para-xylylene or poly(monochloro-p-xylylene). Coatings of these compounds may be achieved by a vacuum coating process, wherein a vacuum chamber evacuated to the equivalent of about 1 mm. mercury is filled with p-xylylene monomer vapor. The surface to be coated is passed through the vacuum chamber and the vapor hitting the cooled surface polymerizes forming a coating on it. On cooled surfaces, the deposition rate may be as high as 1.0 mil/min. The cool surface should be below about 50° C. In turn, the p-xylylene monomer vapor may be formed by first pyrolyzing p-xylene at a temperature of about 950° C. in the presence of steam to yield a cyclic dimer, di-p-xylylene, which may be separated by quenching with a solvent such as benzene or toluene and then heating the dimer in a sublimation chamber to pyrolyze the vapor at about 550° C.

The structure of the polymer may be modified by substituting up to three hydrogens on each benzene ring of the cyclic dimer. For substitution purposes any of the halogens, alkyl or phenol groups may be used. A simple chloro substitution yields poly(monochloro-p-xylylene).

With this vapor deposition process it is possible to obtain poly-para-xylylene coatings as thin as 0.000010 inch with good structural integrity and barrier properties. These very thin coatings have the advantage of avoiding the retardation of heat exchange due to the polymer's low thermal conductivity.

A device according to the present invention is illustrated in the accompanying drawing wherein 10 is a metal substrate, 20 is a coating of chromium and, 30 is a para-xylylene polymer coating.

In operation, steam is fed to the polymeric side of the heat exchange device and a coolant such as water is brought into contact with substrate 10 thus causing dropwise condensation to occur on the para-xylylene polymer coated side as shown in the drawing.

The para-xylene polymer coatings may be applied to any of the conventional metals or alloys used in heat exchanger construction, although it is preferable that the metal or alloy itself be corrosion resistant. If necessary the heat exchanger surfaces may be coated with a corrosion-resistant plating such as chromium. The following examples are illustrative of embodiments of the present invention although the invention is not to be construed as limited thereto.

EXAMPLE I

Five tubes were contacted with 114° C. steam for a period of 24 hours. Four of the tubes were coated with poly-para-xylylene and one was left uncoated as a control. Cooling water flowed through the interior of the tubes in contact with the metal substrate. Overall heat transfer coefficients were measured at two different cooling water rates. After 24 hours of operation, the following results were obtained:

|  | Cooling H$_2$O at 6 ft./sec. | | Cooling H$_2$O at 9.75 ft./sec. | |
|---|---|---|---|---|
|  | Overall heat trans. coeff. (B.t.u./ft.$^2$-hr., °F.) | Condens. rate (cc./sec.) | Overall heat trans. coeff. (B.t.u./ft.$^2$-hr., °F.) | Condens. rate (cc./sec.) |
| 10 microinch parylene N on 90-10 Cu-Ni | 670 | 0.67 | 830 | 0.71 |
| 40 microinch parylene N on 90-10 Cu-Ni | 860 | 0.87 | 1080 | 0.91 |
| 10 microinch parylene N on Cr on 90-10 | 830 | 0.80 | 1080 | 0.91 |
| 40 microinch parylene N on Cr on 90-10 | 800 | 0.77 | 1030 | 0.87 |
| 90-10 Cu-Ni control | 460 | 0.48 | 575 | 0.55 |

Dropwise condensation was observed on all of the coated tubes. All of the coated tubes exhibited an increase in the heat transfer coefficient and condensation rates over the uncoated control. There was some contamination of the coating on the 10 microinch 90-10 Cu-Ni tube by copper oxides from substrate imperfections and consequently that sample exhibited some filmwise condensation which resulted in its poorer performance. The 40 microinch coating on 90-10 Cu-Ni exhibited some peeling after about 50 hours of operation but the coated chromium tubes remained unchanged. The sample consisting of 40 microinches of poly-p-xylylene over 0.002" chromium over 90-10 Cu-Ni has continued to show excellent dropwise condensation after more than 7000 hours as a condensing surface in steam, which includes 5600 hours in steam generated from distilled water and 1400 hours in steam generated from sea water.

EXAMPLE II

A tube having a 20 microinch film of monochloro-p-xylylene over a 0.002" plating of chromium on a 90-10 Cu-Ni base was contacted with 114° C. steam. After 312 hours of operation excellent dropwise condensation was still observed.

EXAMPLE III

A 20 microinch film of monochloro-p-xylylene was coated over a base 90-10 Cu-Ni tube. The tube was subjected to 114° C. steam for 312 hours. Upon inspection, this coating showed adhesional failure.

Various substitutions, alterations and omissions and adaptations are possible without departing from the spirit or scope of the invention. For example, the invention may be used in any heat transfer device in which heat is removed from a vapor through a heat transferring wall by means of a suitable cooling fluid, either liquid or gaseous, the vapor being condensed on the heat transferring wall. Examples of such devices are heat exchangers, evaporators, condensors, tubular heaters, tempering coils, etc. Still other modifications and variations will become apparent to those skilled in the art.

What is claimed is:

1. In a heat transfer device wherein water vapor is condensed by contacting a cooling surface, the improvement comprising a condensing surface of a metal substrate coated with a thin layer of a para-xylylene polymer as said cooling surface.

2. The device of claim 1 wherein the para-xylylene polymer is poly-para-xylylene and the substrate has a non-corrosive surface.

3. The device of claim 1 wherein the para-xylylene polymer is poly(monochloro-p-xylene) and the substrate has a non-corrosive surface.

4. The device of claim 2 wherein the substrate surface contains chromium.

References Cited

UNITED STATES PATENTS

| 2,923,640 | 2/1960 | Buckingham | 117—132 X |
| 3,206,381 | 9/1965 | Neugebauer | 165—133 X |
| 3,300,332 | 1/1967 | Gorham | 117—100 |
| 3,342,754 | 9/1967 | Gorham | 117—161 X |

OTHER REFERENCES

First International Symposium on Water Desalination, Dropwise Condensation, by Robert A. Erb and Edmund Thelen, Oct. 3 to 9, 1965, Washington, D.C.

Promoting Permanent Dropwise Condensation, by Robert A. Erb and Edmund Thelen. Industrial and Engineering Chem. vol. 57, pp. 49–52, October 1965.

MURRAY KATZ, Primary Examiner

W. R. TRENOR, Assistant Examiner

U.S. Cl. X.R.

117—71, 75, 106; 165—133